United States Patent Office 3,749,779
Patented July 31, 1973

3,749,779
STABLE SOLUTIONS OF SODIUM DIPHENYLHYDANTOIN
George H. Schneller, Devon, Howard J. Levin, Norristown, and Stanley Sklar, Broomall, Pa., assignors to American Home Products Corporation, New York, N.Y.
No Drawing. Filed Aug. 27, 1970, Ser. No. 67,558
Int. Cl. A61k 25/00
U.S. Cl. 424—273        11 Claims

ABSTRACT OF THE DISCLOSURE

Disclosed are stable, optically clear, injectable solutions of sodium diphenylhydantoin in a stabilizing vehicle of: propylene glycol; propylene glycol (70.0–99.9%) and ethanol or glycerin (0.1–30.0%); and propylene glycol (80.0–99.9%), a mixture (0.1–20.0%) of ethanol or glycerin (50.0–99.9%) and water (0.1–50.0%). Also disclosed are the above solutions containing monoethanolamine (1.0–8.0%) which when added to dextrose-containing intravenous solutions provide relatively long term optical clarity.

---

The present invention concerns stable, optically clear, injectable solutions of sodium diphenylhydantoin.

Particularly, this invention concerns stable, optically clear, injectable solutions of sodium diphenylhydantoin (SDPH), sodium 5,5 - diphenyl - 2,4-imidazolidinedione, which have been protected against decomposition by incorporation into a stabilizing vehicle composed of propylene glycol; propylene glycol and ethanol or glycerin; and propylene glycol, water and ethanol or glycerin.

More particularly, this invention concerns stable, optically clear, injectable solutions of SDPH which contain from about 50 mg./cc. to about 125 mg./cc. of SDPH dissolved in a stabilizing vehicle selected from the group consisting of, by volume:

(A) propylene glycol;
(B) a mixture, by volume, of from about 70.0% to about 99.9% of propylene glycol and from about 0.1% to about 30.0% of ethanol or glycerin; and
(C) a mixture, by volume, of from about 80.0% to about 99.9% of propylene glycol and from about 0.1% to about 20.0% of a mixture of from about 50.0% to about 99.9% of ethanol or glycerin and from about 0.1% to about 50.0% of water.

Additionally, this invention is concerned with the above-described stabilized injectable solutions of SDPH which additionally contain, by volume, from about 1.0% to about 8.0% of monoethanolamine. This invention is further concerned with stabilized SDPH in all types of injectable packages such as ampuls and vials, but it is particularly concerned with disposable syringe or cartridge-syringe units containing the above-described stabilized SDPH injectable solutions. Still further, this invention is concerned with the increased physical stability obtained in dextrose-containing intravenous solutions (e.g. 5.0% dextrose in water, 5.0% dextrose in physiological saline solution) to which have been added the above stabilized injectable solutions of SDPH containing monoethanolamine.

Sodium diphenylhydantoin is a well-known, recognized pharmacological agent useful in recognized conditions. These conditions include the treatment of status epilepticus and during neurosurgery. In the treatment of adult humans for these conditions, the dose range would vary, by injection, from about 100 mg. to about 250 mg. Further information concerning the well-known injectable use of SDPH injection may be obtained by consulting the American Hospital Formulary Service, published by American Society of Hospital Pharmacists, 4360 Montgomery Ave., Washington, D.C. 20014, see Anticonvulsants 28:12, copyright March 1969.

Although the use of SDPH by injection is well-known, the only SDPH injections commercially available have been in the form of a powder of SDPH for reconstitution which is packaged with a special diluent consisting of 10% ethanol, 50% water and 40% propylene glycol adjusted to a pH of 12.0 with sodium hydroxide.

Several drawbacks exist to the use of this reconstitutable product as presently available. First, the product is difficult to dissolve. The manufacturer, in order to overcome the problem, recommends warming of the mixture to hasten solution, a procedure which greatly interferes with the ready availability and ease of use of the product. Second, the product, after reconstitution, must be used in a short period of time, several hours, as recommended by the manufacturer; deterioration readily occurs and the product becomes unfit for use after this period; this effectively prevents the advance preparation of SDPH injections or the use of disposable pre-filled syringe or cartridge-syringe units. When time is of the essence, such as in treating emergency cases, the availability of a previously prepared solution particularly in disposable injection units would greatly expedite treatment. Third, the presently available reconstituted injectable solutions are incompatible with the commonly used dextrose-containing intravenous solutions (i.e. 5.0% dextrose in water, 5.0% dextrose in physiological saline solution) as a precipitate forms within a few minutes following the addition of the reconstituted SDPH solution to the dextrose solution. This physical incompatibility prevents the use of SDPH in continuous intravenous therapy of patients where such therapy would be indicated. The use of this invention, therefore, offers the following advantages over the current commercially available product, which must be reconstituted. First and second, it is a ready-made and stable injectable solution. These two advantages enable the product to be available packaged in ampuls and vials as well as disposable pre-filled syringes or cartridge-syringe units such as those described in U.S. Pat. No. 3,247,850 and U.S. Pat. No. 3,366,113, thus making the drug immediately available for emergency or routine use. This ready availability is a dramatic improvement over the currently available SDPH product. A third advantage is that the incorporation of monoethanolamine renders the solution physically compatible with dextrose-containing intravenous solutions while precipitate forms within a few minutes upon the addition of the reconstitutable product as presently available. A fourth advantage is that by using the 125 mg./cc. solution attainable under the scope of this invention, the volume injected has been reduced to 40% of the volume needed with the presently available reconstitutable product. Thus, for example, a 250 mg. dose requiring an injection of 5 cc. with the reconstitutable product requires only an injectable volume of 2 cc. under the scope of this invention.

The present invention deals with stable, optically clear, injectable solutions of SDPH which are found to overcome the problems of the prior reconstitutable injections and are unexpectedly capable of storage for periods of time which allow their being supplied as prepared injectable solutions rather than as powders which have to be put into solution before use.

The following examples are given by way of illustration and are not to be construed as limitations of this invention, many variations of which are possible without departing from the scope and spirit thereof.

EXAMPLE I

A mixture is prepared of 600 cc. propylene glycol, 100 cc. water and 105 cc. of 95% ethanol. Into this mixture is added 125.0 gm. of sodium diphenylhydantoin followed by the addition of sufficient propylene glycol to provide one liter. This provides a solution having a strength of 125 mg./cc. of active ingredient.

The above-described preparation is repeated using vehicles having the final compositions:

TABLE 1

| Ingredients | Composition, by volume in cc., of final vehicle | | | | | | |
|---|---|---|---|---|---|---|---|
| | A | B | C | D | E | F | G |
| Water | | | 10.0 | | | 5.0 | |
| Ethanol | 20.0 | 10.0 | | | | | |
| Glycerin | | | 10.0 | | 30.0 | 5.0 | 10.0 |
| Propylene glycol, approx. to make 100.0 cc | 80.0 | 90.0 | 80.0 | 100.0 | 70.0 | 90.0 | 90.0 |

EXAMPLE II

The preparation of the solutions as in Example I is repeated, providing 50 gm. of sodium diphenylhydantoin per liter of final solution, giving a final strength of 50 mg./cc.

EXAMPLE III

In preparation of the solutions as in Example I is repeated, using 62.5 gm. of sodium diphenylhydantoin, providing a final solution having a strength of 62.5 mg./cc.

EXAMPLE IV

The preparation of the solutions as in Example I is repeated using 75 gm. of sodium diphenylhydrantoin providing a final solution having a strength of 75 mg./cc.

EXAMPLE V

The preparation of the solutions as in Example I is repeated using 100 gm. of sodium diphenylhydantoin providing a final solution having a strength of 100 mg./cc.

EXAMPLE VI

A solution is prepared as in Example I using sufficient monoethanolamine during preparation to provide a concentration, by volume, of 2.0% monoethanolamine. The final solution has a concentration of 125 mg./cc. of sodium diphenylhydantoin dissolved in a vehicle having a composition, by volume, of:

| | Percent |
|---|---|
| Water | 10.0 |
| Ethanol | 10.0 |
| Monoethanolamine | 2.0 |
| Propylene glycol approximately | 78.0 |
| To make 100.0. | |

In a similar manner are prepared solutions having 125 mg./cc. of sodium diphenylhydantoin in a vehicle having the following composition, by volume:

TABLE 2

| Ingredients | Composition, by volume in cc., of final vehicle | | | | | | | |
|---|---|---|---|---|---|---|---|---|
| | A | B | C | D | E | F | G | H |
| Water | | | 10.0 | | | 5.0 | | |
| Ethanol | 20.0 | 10.0 | | | | | | |
| Glycerin | | | 10.0 | | 26.0 | 5.0 | 10.0 | 9.0 |
| Monoethanolamine | 8.0 | 5.0 | 3.0 | 1.0 | 4.0 | 2.0 | 3.0 | 2.0 |
| Propylene glycol, approx. to make 100.0 cc | 72.0 | 85.0 | 77.0 | 99.0 | 70.0 | 88.0 | 77.0 | 89.0 |

EXAMPLE VII

In a manner similar to that described in Example VI, solutions are prepared having the following final amounts of sodium diphenylhydantoin: 50 mg./cc.; 62.5 mg./cc.; 75 mg./cc.; and 100 mg./cc.

A series of tests were run comparing the stability of solutions included in this invention as compared to similar prior art solutions not included in this invention. Table 3, following, lists various vehicles which were prepared containing 125 mg./cc. of sodium diphenylhydantoin and the results thereof upon storage at 25° C. and 60° C. in ampuls.

TABLE 3

| Solution: | Percent, by volume, composition of vehicle for solution | | | Physical condition after storage for ten months at. | |
|---|---|---|---|---|---|
| | Propylene glycol | Ethyl alcohol | Water | 25° C. | 60° C. |
| 1 | 70 | 10 | 20 | Fine ppt | Fine ppt. |
| 2 | 80 | 10 | 10 | Clear | Clear. |
| 3 | 80 | 20 | | do | Do. |
| 4 | 90 | 10 | | do | Do. |
| 5 | 100 | | | do | Do. |
| 6 | 90 | | 10 | (²) | (²) |
| 7 | 70 | 20 | 10 | Fine ppt | Fine ppt. |
| 8¹ | 40 | 10 | 50 | (²) | (²) |

¹ Commercially available diluent adjusted to a pH of 12.0 with sodium hydroxide.
² Unable to achieve solution at 125 mg./cc.

The data presented by Table 3 clearly points out that injectable solutions of sodium diphenylhydantoin prepared within the scope of this invention surprisingly remain optically clear and useful as injections upon prolonged storage, whereas solutions prepared outside the scope of this invention (prior art) are not so usable. Physical condition after storage is determined by optical examination.

A series of tests were run to demonstrate the stability of the solutions of this invention when packaged in a disposable pre-filled cartridge-syringe unit (Tubex®). Table 4, following, lists the physical and chemical stability obtained using the vehicle described as Solution 2 in Table 3. Concentrations of both 125 mg./cc. and 50 mg./cc. of sodium diphenylhydantoin (SDPH) are included. In comparison, prior art compositions are no longer usable several hours after reconstitution.

TABLE 4

| SDPH concentrate | Physical condition after storage | | | Chemical analysis of SDPH after storage | | |
|---|---|---|---|---|---|---|
| | Time, months | Temp., °C. | Condition | Time, months | Temp., °C. | (Percent) initial |
| 50 mg./cc | 5 | 25 | Clear | | | |
| 50 mg./cc | 4 | 60 | do | 5 | 45 | 98.0 |
| 125 mg./cc | 18 | 25 | do | | | |
| 125 mg./cc | 12 | 45 | do | 4.5 | 45 | 98.0 |

A series of tests were run to demonstrate the effect of monoethanolamine upon SDPH solutions which are added to dextrose-containing intravenous solutions. In Table 5, following, dextrose-containing intravenous solutions are compared as to relative physical condition after the addition of various SDPH solutions. Solution 1 contains 50 mg./cc. of SDPH. Solution 1 is prepared using a vehicle composed of 40% propylene glycol, 10% ethyl alcohol and 50% water adjusted to a pH of 12.0 with sodium hydroxide. Solutions 2, 3 and 4 contain 125 mg./cc. SDPH. Solution 2 is prepared using a vehicle composed of 80% propylene glycol, 10% ethyl alcohol and 10% water. Solution 3 is solution 2 plus 2% monoethanolamine and solution 4 is solution 2 plus 5% monoethanolamine. In Table 5, "Maximum Length of Useful Time" represents the time a one liter dextrose-containing solution remains optically clear after the addition of 1 cc. of the respective SDPH solution.

TABLE 5

|  | Maximum length of useful time | |
|---|---|---|
|  | 5% dextrose/ water | 5% dextrose/ saline |
| Solution: | | |
| 1 | 5 minutes | 5 minutes |
| 2 | 1 minute | 1 minute |
| 3 | 1 hour | 1 hour |
| 4 | 6 hours | 24 hours |

The data represented in Table 5 clearly points out that the incorporation of monoethanolamine into stabilized SDPH solutions as taught in this invention provides compositions physically compatible over extended time periods with dextrose-containing intravenous solutions and are, therefore, unexpectedly useful.

What is claimed:

1. A stable, optically clear, injectable solution suitable for treatment of status epilepticus and for use during neurosurgery consisting essentially of an effective amount of from about 50.0 mg./cc. to about 125 mg./cc. of sodium diphenylhydantoin dissolved in a stabilizing amount of a vehicle selected from the group consisting of:
   (A) propylene glycol;
   (B) a mixture, by volume, of from about 70.0% to about 99.9% of propylene glycol and from about 0.1% to about 30.0% of ethanol or glycerin; and
   (C) a mixture, by volume, of from about 80.0% to about 99.9% of propylene glycol and from about 0.1% to about 20.0% of a mixture of from about 50.0% to about 99.9% of ethanol or glycerin and from about 0.1% to about 50.0% of water.

2. The solution of claim 1, wherein said vehicle is propylene glycol.

3. The solution of claim 1, wherein said vehicle consists essentially of from about 70.0% to about 99.9% of propylene glycol and from about 0.1% to about 30.0% of ethanol.

4. The solution of claim 3 wherein said vehicle consists of about 80.0% propylene glycol and about 20.0% of ethanol.

5. The solution of claim 3 wherein said vehicle consists of about 90.0% propylene glycol and about 10.0% of ethanol.

6. The solution of claim 1 wherein said vehicle consists essentially of from 70.0% to about 99.9% of propylene glycol and from about 0.1% to about 30.0% of glycerin.

7. The solution of claim 1 wherein said vehicle consists of from about 80.0% to about 99.9% of propylene glycol and from about 0.1% to about 20.0% of a mixture of from about 50.0% to about 99.9% of ethanol or glycerin and from about 0.1% to about 50.0% of water.

8. The solution of claim 7 wherein said vehicle consists of from about 80.0% to about 99.9% of propylene glycol and from about 0.1% to about 20.0% of a mixture of from about 50.0% to about 99.9% of ethanol and from about 0.1% to about 50.0% of water.

9. The solution of claim 8 wherein said vehicle consists of about 80.0% propylene glycol, about 10.0% ethanol and about 10.0% water.

10. The solution of claim 7 wherein said vehicle consists of from about 80.0% to about 99.9% of propylene glycol and from about 0.1% to about 20.0% of a mixture of from about 50.0% to about 99.9% of glycerin and from about 0.1% to about 50.0% of water.

11. The solution of claim 10 wherein said vehicle consists of about 80.0% propylene glycol, about 10.0% glycerin and about 10.0% of water.

References Cited

Chemical Abstracts, vol. 54 (1960), p. 21638e.
Remingtons Pharmaceutical Sciences (1965), 13th ed. p. 1432.
Chemical Abstracts, vol. 54 (1960), p. 11678c.

ALBERT T. MEYERS, Primary Examiner
V. D. TURNER, Assistant Examiner